US010309518B2

(12) United States Patent
Koponen et al.

(10) Patent No.: US 10,309,518 B2
(45) Date of Patent: Jun. 4, 2019

(54) GEAR UNIT AND A METHOD FOR HEATING LUBRICANT OIL OF A GEAR UNIT

(71) Applicant: Moventas Gears Oy, Jyväskylä (FI)

(72) Inventors: Mikko Koponen, Jämsä (FI); Tuomas Vuolle-Apiala, Jyväskylä (FI)

(73) Assignee: MOVENTAS GEARS OY, Jyväskylä (FI)

( * ) Notice: Subject to any disclaimer, the term of this patent is extended or adjusted under 35 U.S.C. 154(b) by 463 days.

(21) Appl. No.: 14/717,677

(22) Filed: May 20, 2015

(65) Prior Publication Data
US 2015/0337946 A1 Nov. 26, 2015

(30) Foreign Application Priority Data
May 20, 2014 (EP) ..................................... 14169028

(51) Int. Cl.
*F16H 57/04* (2010.01)

(52) U.S. Cl.
CPC ..... *F16H 57/0412* (2013.01); *F16H 57/0417* (2013.01); *F16H 57/0434* (2013.01); *F16H 57/0413* (2013.01)

(58) Field of Classification Search
CPC ............. F16H 57/0412; F16H 57/0413; F16H 57/0417; F16N 39/04; F28D 1/0213
See application file for complete search history.

(56) References Cited

U.S. PATENT DOCUMENTS 1,723,082 A * 8/1929 Schumann ........... B65D 88/744
            122/32
1,799,379 A * 4/1931 Lane ........................ F23K 5/20
            126/343.5 A
(Continued)

FOREIGN PATENT DOCUMENTS

CN          102237754 A      11/2011
CN          103047399 A       4/2013
(Continued)

OTHER PUBLICATIONS

European Search Report issued in EP 14 16 9028 dated Dec. 5, 2015.
(Continued)

*Primary Examiner* — Minh Truong
(74) *Attorney, Agent, or Firm* — Birch, Stewart, Kolasch & Birch, LLP

(57) ABSTRACT

A gear unit comprises shafts (101, 102) for connecting to an external mechanical system, at least one gear stage (103) between the shafts, a lubricant oil room (104) for storing lubricant oil, an oil channel (105) for transporting the lubricant oil from the lubricant oil room to the at least one gear stage, and an immersion heater (106) for heating the lubricant oil flowing in the lubricant oil room towards an inlet of the oil channel. The gear unit further comprises a mechanical flow guide (108) located in the lubricant oil room and configured to modify flow of the lubricant oil flowing towards the inlet of the oil channel so as to increase flow velocity of the lubricant oil on the surface of the immersion heater. The increased flow velocity on the surface of the immersion heater makes it possible to use higher heating power without damaging the lubricant oil.

20 Claims, 5 Drawing Sheets

(56) References Cited

U.S. PATENT DOCUMENTS

| | | | | |
|---|---|---|---|---|
| 2,796,239 | A * | 6/1957 | Holmes | F28D 1/0213 |
| | | | | 165/164 |
| 3,276,517 | A * | 10/1966 | Lowe | F24H 3/006 |
| | | | | 165/108 |
| 3,416,633 | A * | 12/1968 | Swearingen | F16N 39/04 |
| | | | | 123/196 R |
| 3,633,658 | A * | 1/1972 | Kirschner | F24H 1/208 |
| | | | | 165/104.31 |
| 3,799,432 | A * | 3/1974 | Schneider | G05D 23/10 |
| | | | | 236/101 E |
| 3,856,078 | A * | 12/1974 | Dahl | D06B 19/0094 |
| | | | | 165/108 |
| 6,615,438 | B1 * | 9/2003 | Franco | B60S 1/482 |
| | | | | 15/250.01 |
| 8,020,782 | B2 * | 9/2011 | Moser | G01K 5/62 |
| | | | | 123/41.08 |
| 9,016,356 | B2 * | 4/2015 | Hollweck | F01M 5/002 |
| | | | | 165/157 |
| 9,562,476 | B2 * | 2/2017 | Bastnagel | F01D 17/085 |
| 2009/0191060 | A1 | 7/2009 | Bagepalli et al. | |
| 2011/0024236 | A1 | 2/2011 | Yano et al. | |
| 2011/0272214 | A1 * | 11/2011 | Vuolle-Apiala | F16H 1/46 |
| | | | | 184/6.12 |
| 2011/0286844 | A1 | 11/2011 | Takayanagi | |
| 2014/0161431 | A1 | 6/2014 | Oh | |

FOREIGN PATENT DOCUMENTS

| | | |
|---|---|---|
| CN | 203230541 U | 10/2013 |
| DE | 271 936 A1 | 9/1969 |
| DE | 10 2013 206 507 A1 | 6/2014 |

OTHER PUBLICATIONS

Chinese Office Action and Search Report for Chinese Application No. 201510260960.6, dated Jun. 4, 2018, with English translation.

* cited by examiner

GEAR UNIT AND A METHOD FOR HEATING LUBRICANT OIL OF A GEAR UNIT

FIELD OF THE INVENTION

The invention relates to a gear unit that can be, for example but not necessarily, a gear unit of a wind power plant. Furthermore, the invention relates to a method for heating lubricant oil of a gear unit.

BACKGROUND

A lubrication system of a gear unit comprises typically a lubrication pump that is arranged to circulate lubricant oil through a gear stage or gear stages of the gear unit and through the bearings of the gear unit. As the viscosity of the lubricant oil is strongly dependent on its temperature, the lubrication pump can be overloaded or even damaged if the lubricant oil is cold and thereby its viscosity is too high for being pumped by the lubrication pump. Especially in cold weather conditions, the lubricant oil has to be heated during a starting phase of a gear unit so as to make the lubricant oil capable of being pumped and capable of properly lubricating the gear stage or gear stages of the gear unit and the bearings of the gear unit.

A known technical solution is to connect an external heater and a pump to an oil sump or an oil tank of a gear unit, where the pump is configured to circulate the lubricant oil through the external heater. An inconvenience related to this technical solution is that a quite long time is typically needed to heat up a sufficient amount of the lubricant oil in the oil sump or in the oil tank, and furthermore a large amount of energy is required.

Publication US20090191060 describes a gear unit comprising a lubrication pump for circulating lubrication oil, a suction pipe for transporting the lubrication oil from an oil sump or an oil tank to the lubrication pump, and a heating element in thermal connection with at least a portion of the suction pipe. The heating element is used to heat up the lubrication oil contained within the suction pipe to temperature where damaging of the lubrication pump is avoided. An inconvenience related to this approach is the difficulty to suck the lubricant oil through the suction pipe from the oil sump or the oil tank when the lubricant oil in the oil sump or in the oil tank is cold and thereby the viscosity of the lubricant oil in the oil sump or in the oil tank is high.

One known technical solution is to provide an oil sump or an oil tank with one or more immersion heaters for heating up the lubrication oil being in the oil sump or in the oil tank. An inconvenience related to this approach is that the heating power density, $W/cm^2$, on the surface of the one or more immersion heaters has to be limited in order to avoid damaging the lubricant oil due to local overheating of the lubricant oil on the surface of the one or more immersion heaters. Limiting the heating power density increases, however, the time needed for heating up a sufficient amount of the lubricant oil to temperature where damaging of the lubrication pump is avoided.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the term gearwheel means a cogged, rotating machine part. Two or more meshing gearwheels constitute a gear stage. The term gear as such refers in this document to a mechanical system having a first shaft and a second shaft, between which one or more gear stages provide speed and torque conversions and/or a change in a direction of a rotation axis. A gear unit comprises a gear proper and may comprise auxiliary augmenting systems, such as instrumentation, control, and lubrication arrangements.

In accordance with the present invention, there is provided a new gear unit that can be, for example but not necessarily, a gear unit of a wind power plant. A gear unit according to the invention comprises:
- a first shaft and a second shaft for connecting to an external mechanical system,
- at least one gear stage between the first and second shafts,
- a lubricant oil room for storing lubricant oil,
- an oil channel for transporting the lubricant oil from the lubricant oil room to the at least one gear stage,
- an immersion heater for heating the lubricant oil flowing in the lubricant oil room towards an inlet of the oil channel, the immersion heater being located in the lubricant oil room, and
- a mechanical flow guide located in the lubricant oil room and configured to modify flow of the lubricant oil flowing towards the inlet of the oil channel so as to increase the flow velocity of the lubricant oil on the surface of the immersion heater.

The increased flow velocity on the surface of the immersion heater makes it possible to use a higher heating power density without causing such hot-spots in the lubricant oil which would damage the lubricant oil.

The gear unit may comprise a lubrication pump for circulating the lubricant oil through the at least one gear stage and the bearings of the gear unit. It is also possible that the gear unit is provided with piping interfaces for connecting to an external pump for pumping the lubricant oil.

A wind power plant according to the invention comprises:
- a rotor for receiving mechanical power from wind,
- a generator for converting the mechanical power into electrical energy, and
- a gear unit according to the invention for transferring the mechanical power from the rotor to the generator.

In accordance with the present invention, there is provided also a new method for heating lubricant oil of a gear unit. A method according to the invention comprises:
- heating, with an immersion heater located in a lubricant oil room, the lubricant oil flowing in the lubricant oil room towards an inlet of an oil channel transporting the lubricant oil from the lubricant oil room to parts of the gear unit to be lubricated, and
- modifying, with a mechanical flow guide located in the lubricant oil room and submerged in the lubricant oil, flow of the lubricant oil flowing towards the inlet of the oil channel so as to increase the flow velocity of the lubricant oil on the surface of the immersion heater.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

Figure 1A:
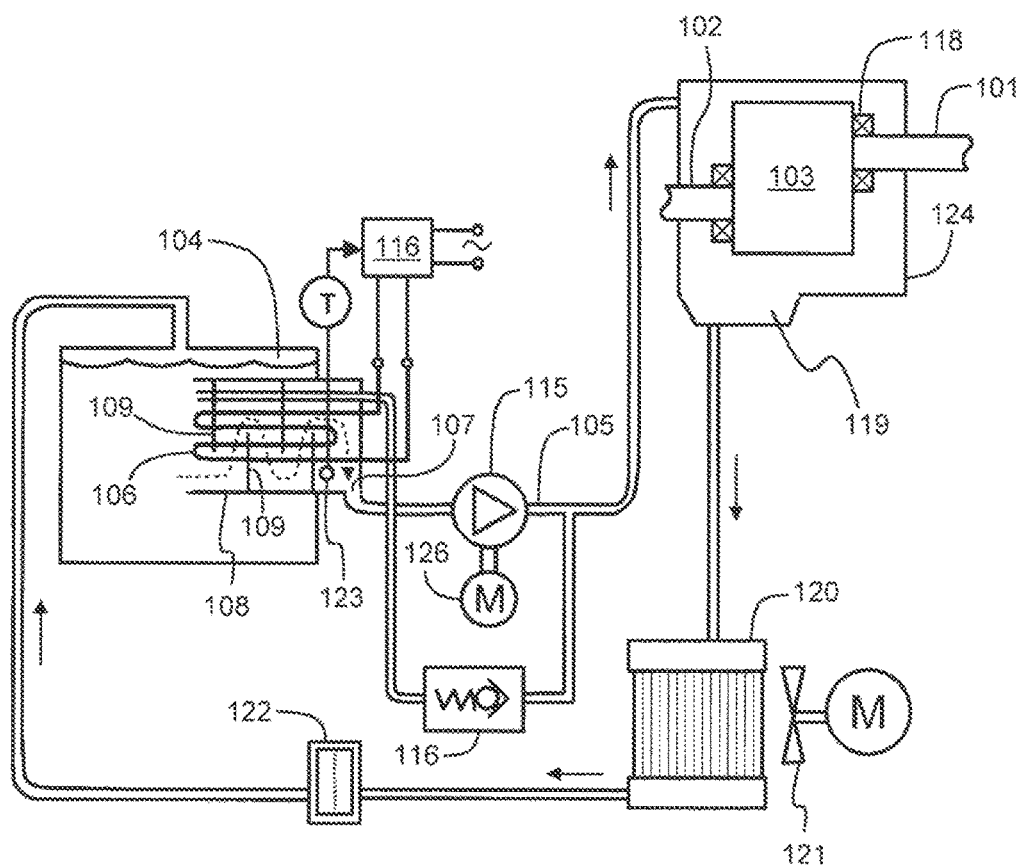
FIGS. 1a and 1b illustrate a gear unit according to an exemplifying and non-limiting embodiment of the invention.

FIG. 1a shows a schematic illustration of a gear unit according to an exemplifying and non-limiting embodiment of the invention. The gear unit comprises a first shaft 101 and a second shaft 102 for connecting to an external mechanical system. The external mechanical system may comprise, for example but not necessarily, a wind turbine that can be connected to the shaft 101 and a generator that can be connected to the shaft 102, i.e. the gear unit can be for example a gear unit suitable for a wind power application. The gear unit comprises at least one gear stage 103 between the shafts 101 and 102. The at least one gear stage may comprise, for example, one or more planet gear stages, one or more cylindrical gear stages and/or one or more conical gear stages, or a combination of gear stages of the kind mentioned above. In the exemplifying case illustrated in FIG. 1a, the gear unit comprises an oil tank that constitutes a lubricant oil room 104 for storing lubricant oil of the gear unit. For storing the lubricant oil there can be, instead of or in addition to the oil tank, an oil sump 119 constituted by a casing 124 surrounding the at least one gear stage 103. The gear unit comprises an oil channel 105 for transporting the lubricant oil from the lubricant oil room 104 to the at least one gear stage 103 and to the bearings of the gear unit. One of the bearings is denoted with a reference number 118 in FIG. 1a. Furthermore, the gear unit comprises oil channels for transporting the lubricant oil from the casing 124 back to the oil tank. The gear unit comprises a lubrication pump 115 for circulating the lubricant oil through the at least one gear stage 103 and the bearings of the gear unit. The lubrication pump can be, for example, a gear type pump. The gear unit may further comprise one or more filter elements 122 for removing impurities from the lubricant oil. Furthermore, the gear unit may comprise a pressure relief valve 116 for protecting the lubrication system against overpressure. The gear unit may further comprise other auxiliary augmenting systems such as e.g. an arrangement for monitoring the oil level in the oil tank, and/or an arrangement for monitoring mechanical vibrations, etc.

Figure 1B:
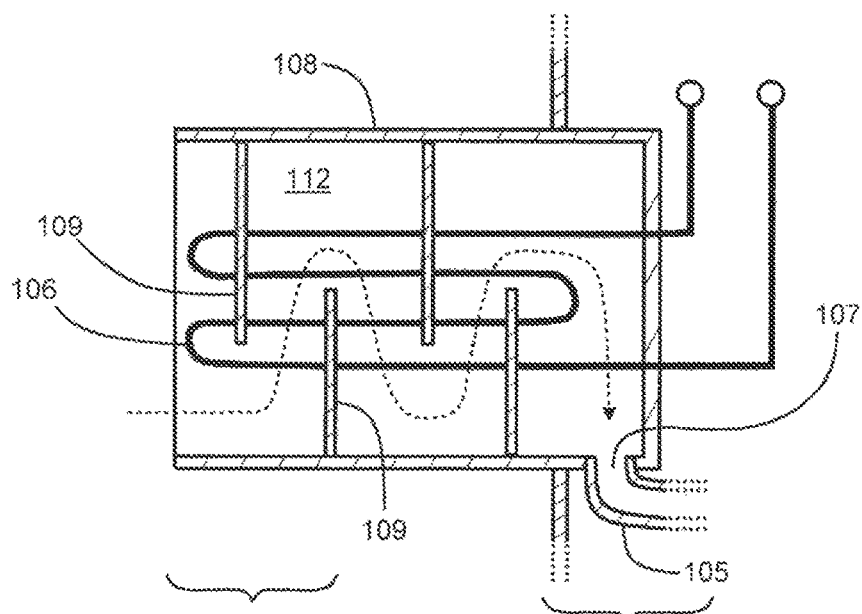

The gear unit comprises an immersion heater 106 for heating the lubricant oil flowing in the lubricant oil room 104 towards an inlet 107 of the oil channel 105. The gear unit further comprises a mechanical flow guide 108 located in the lubricant oil room and configured to modify the flow of the lubricant oil flowing towards the inlet of the oil channel so as to increase the flow velocity of the lubricant oil on the surface of the immersion heater 106. FIG. 1b shows a magnified view of the immersion heater 106 and of the mechanical flow guide 108. In FIGS. 1a and 1b, the mechanical flow guide 108 is presented as a section view. The increased flow velocity on the surface of the immersion heater 106 makes it possible to use a higher heating power density, $W/cm^2$, without causing such local hot-spots in the lubricant oil which would damage the lubricant oil. In the exemplifying case illustrated in FIGS. 1a and 1b, the mechanical flow guide comprises a tubular part 112 so that the immersion heater 106 is located inside the tubular part. A first end-region 113 of the tubular part is open so as to allow the lubricant oil to enter the tubular part and the oil channel 105 is connected to a second end-region 114 of the tubular part, i.e. the inlet 107 of the oil channel is at the second end-region 114 of the tubular part. The mechanical flow guide 108 comprises flow directing parts for guiding the lubricant oil to flow in a meandering way so as to increase the flow velocity of the lubricant oil on the surface of the immersion heater 106. In FIGS. 1a and 1b, two of the flow directing parts are denoted with a reference number 109. The meandering flow of the lubricant oil is depicted with a dashed line having an arrow head. It is worth noting, that a mechanical flow guide for increasing the flow velocity on the surface of the immersion heater does not necessarily comprise a tubular part that surrounds the immersion heater. It is also possible that a mechanical flow guide comprises flow guiding fins mechanically supported by an appropriate support frame.

Figure 5:
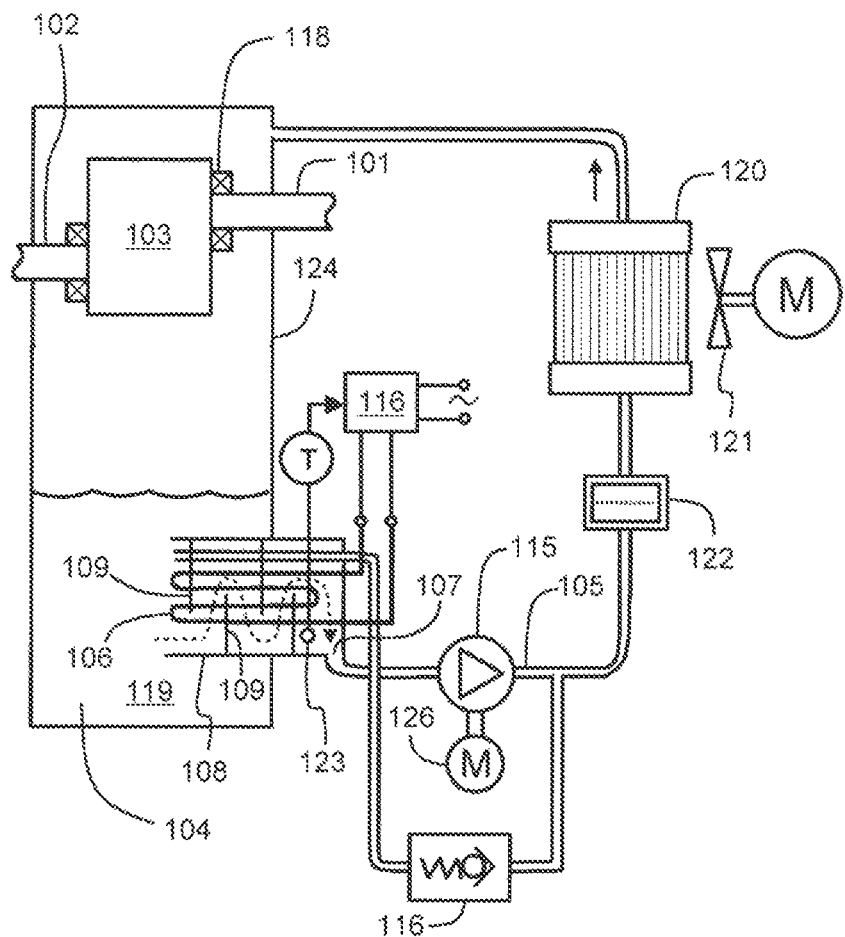
FIG. 5 illustrates a gear unit according to an exemplifying and non-limiting embodiment of the invention.

A gear unit according to an exemplifying and non-limiting embodiment of the invention comprises a temperature sensor 123 configured to measure the temperature of the lubricant oil entering the oil channel 105. It is also possible that there are many temperature sensors in the mechanical flow guide 108 so as to find out an estimate of the maximum oil temperature prevailing in the vicinity of the immersion heater 106. The power of the immersion heater 106 is advantageously controlled on the basis of the one or more measured temperatures. In FIG. 1a, a block 116 represents a controller for controlling the power of the immersion heater 106. Furthermore, the measured one or more temperatures can be used for controlling a motor 126 configured to drive the lubrication pump 115. For example, the rotational speed of the lubrication pump 115 can be limited to be below a speed limit that depends on the one or more measured temperatures. The speed limit is advantageously lower at lower temperatures than at higher temperatures so as to protect the lubrication pump 115 from damaging when the lubricant oil is cold and thereby its viscosity is high. It is also possible that there are one or more temperature sensors inside the casing 124 for measuring one or more temperatures from the lubricant oil. These one or more measured temperatures can be used for controlling a blower 121 of an oil-cooler element 120 for cooling the lubricant oil. FIG. 5 shows a schematic illustration of an exemplifying gear unit where the immersion heater 106 and the mechanical flow guide 108 are located in the oil sump 119 constituted by the casing 124 surrounding the gear stage 103.

Figure 2:
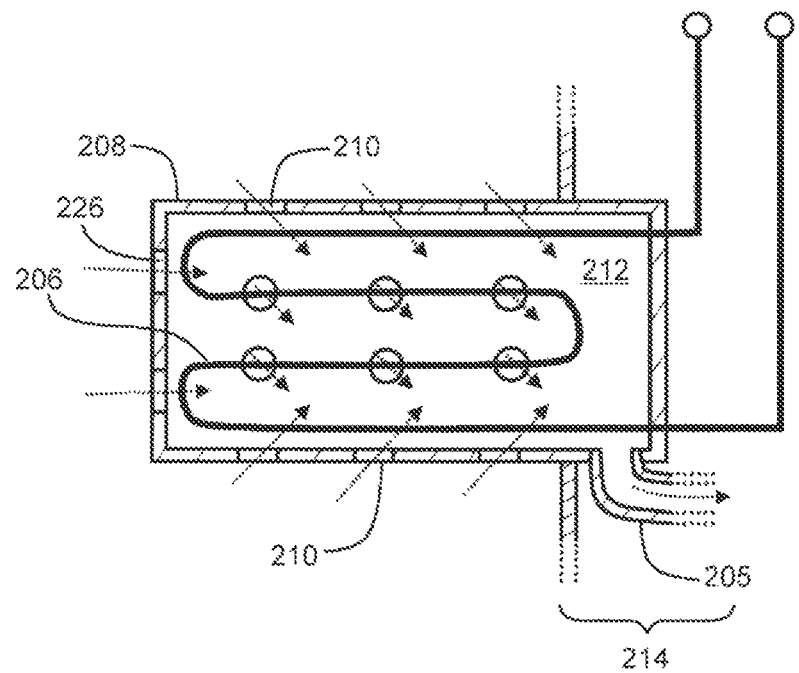
FIG. 2 illustrates a part of a gear unit according to an exemplifying and non-limiting embodiment of the invention.

FIG. 2 shows a section view of a mechanical flow guide 208 of a gear unit according to an exemplifying and non-limiting embodiment of the invention. In this exemplifying case, the mechanical flow guide 208 comprises a tubular part 212 that includes an immersion heater 206. An inlet of an oil channel 205 is at an end-region 214 of the tubular part. The walls of the a tubular part 212 comprise apertures for providing local minima of the cross-sectional flow area so as to increase the flow velocity of the lubricant oil on the surface of the immersion heater 206. The tubular part 212 may comprise one or more apertures on its side-walls like e.g. apertures 210, or one or more apertures on its end-wall like e.g. aperture 226, or apertures on both the side-walls and the end-wall.

Figure 3A:
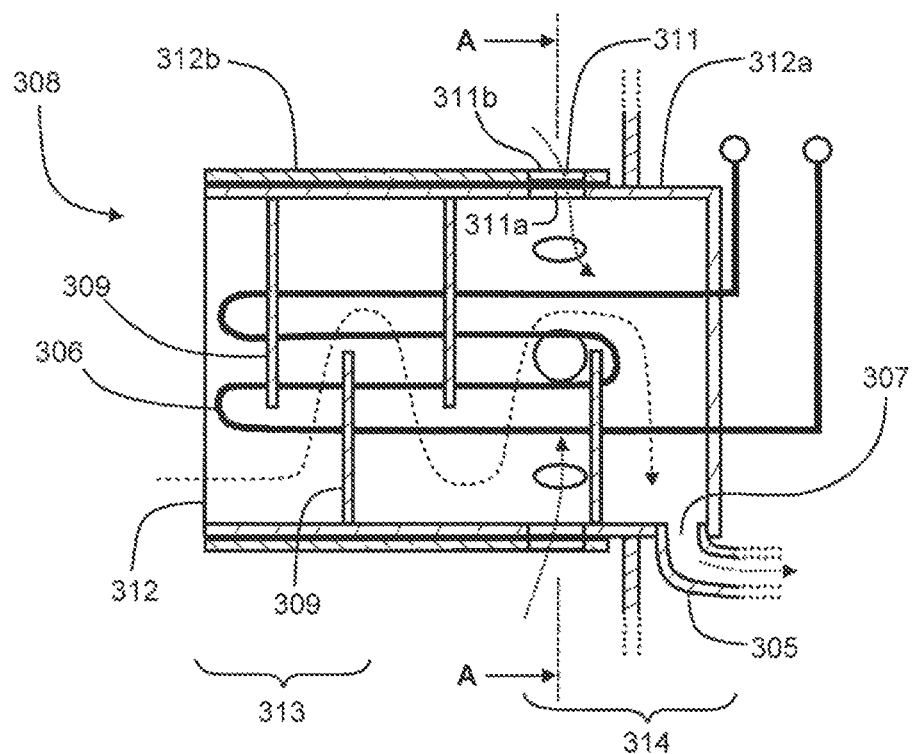
FIGS. 3a, 3b and 3c illustrate a part of a gear unit according to an exemplifying and non-limiting embodiment of the invention.

FIG. 3a shows a section view of a mechanical flow guide 308 of a gear unit according to an exemplifying and non-limiting embodiment of the invention. The mechanical flow guide 308 comprises a tubular part 312 so that an immersion heater 306 is located inside the tubular part. A first end-region 313 of the tubular part is open so as to allow the lubricant oil to enter the tubular part, and an inlet 307 of an oil channel 305 for removing the lubricant oil from the tubular part is at a second end-region 314 of the tubular part. The mechanical flow guide 308 comprises flow directing parts that are inside the tubular part and substantially perpendicular to the longitudinal direction of the tubular part. The flow directing parts are configured to guide the lubricant oil to flow in a meandering way inside the tubular part so as to increase the flow velocity of the lubricant oil on the surface of the immersion heater 306. In FIG. 3a, two of the flow directing parts are denoted with a reference number 309. The meandering flow of the lubricant oil is depicted with a dashed line having an arrow head. The tubular part 312 comprises apertures at the second end-region 314 for allowing the lubricant oil surrounding the tubular part to enter the tubular part so as to decrease the oil temperature difference between the second end-region 314 of the tubular part and the first end-region 313 of the tubular part. In FIG. 3a, one of the apertures is denoted with a reference number 311. The lubricant oil is warmed by the immersion heater 306 when the lubricant oil flows from the first end-region 313 towards the second end-region 314. Thus, in many cases, it is advantageous to mix the lubricant oil warmed in the tubular part with colder lubricant oil entering the tubular part via the apertures at the second end-region 314 so as to limit the maximum temperature of the lubricant oil.

Figure 3B:
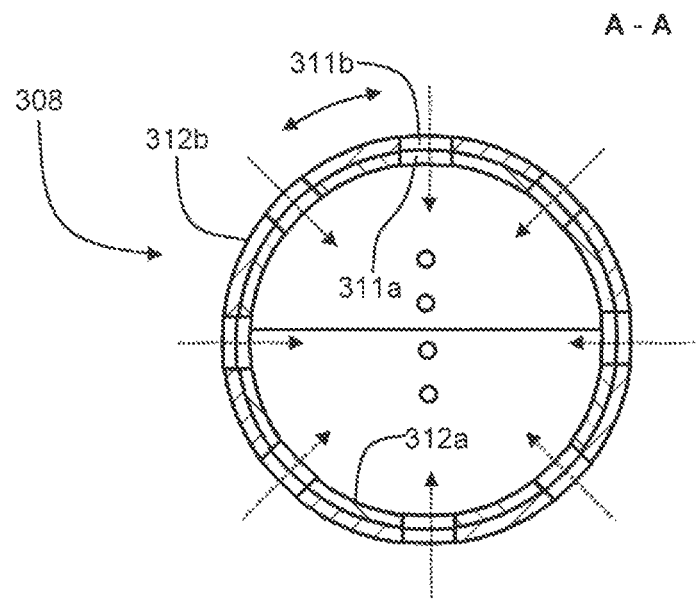
Figure 3C:
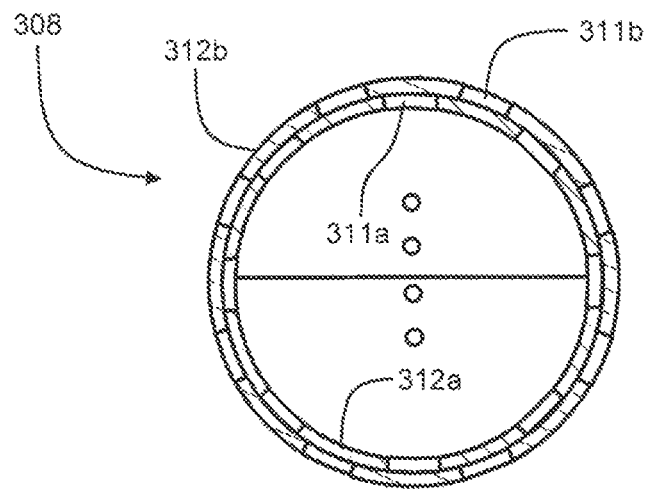

In a gear unit according to an exemplifying and non-limiting embodiment of the invention, the mechanical flow guide 308 comprises a control mechanism for changing areas of the above-mentioned apertures. When there is no need to heat the lubricant oil, the immersion heater 306 is not energized and the flow resistance of the mechanical flow guide 308 is advantageously minimized in order to save energy needed for circulating the lubricant oil. The above-mentioned control mechanism may comprise for example clappers for adjusting the flow resistance of the apertures. In the exemplifying case illustrated in FIG. 3a, the tubular part 312 comprises two nested elements 312a and 312b so that an inner surface of the outer element 312b is against an outer surface of the inner element 312a and the outer element 312b is rotatable with respect to the inner element 312a. The above-mentioned apertures of the tubular part 312 are constituted by apertures of the outer and inner elements when the apertures of the outer and inner elements are at least partly aligned with each other. This is illustrated with the aid of FIGS. 3b and 3c. In FIGS. 3a, 3b and 3c, one of the apertures of the inner element 312a is denoted with a reference number 311a and a corresponding one of the apertures of the outer element 312b is denoted with a reference number 311b. FIG. 3b shows a view of a section taken along a line A-A shown in FIG. 3a. In the exemplifying situation shown in FIGS. 3a and 3b, the apertures of the outer element 312b are fully aligned with the apertures of the inner element 312a. FIG. 3c shows a section view corresponding to that shown in FIG. 3b but, in the exemplifying situation shown in FIG. 3c, the outer element 312b has been rotated with respect to the inner element 312a so that the apertures of the outer element 312b are not even partially aligned with the apertures of the inner element 312a and thus the apertures are closed. Thus, the areas of the apertures of the tubular part 312 are changeable by rotating the outer element 312b with respect to the inner element 312a.

An arrangement of the kind illustrated in FIGS. 3a-3c for changing areas of apertures can be used also in conjunction with the mechanical flow guide 208 shown in FIG. 2 if the tubular part 212 of the mechanical flow guide 208 has a circular cross-section.

Figure 4:
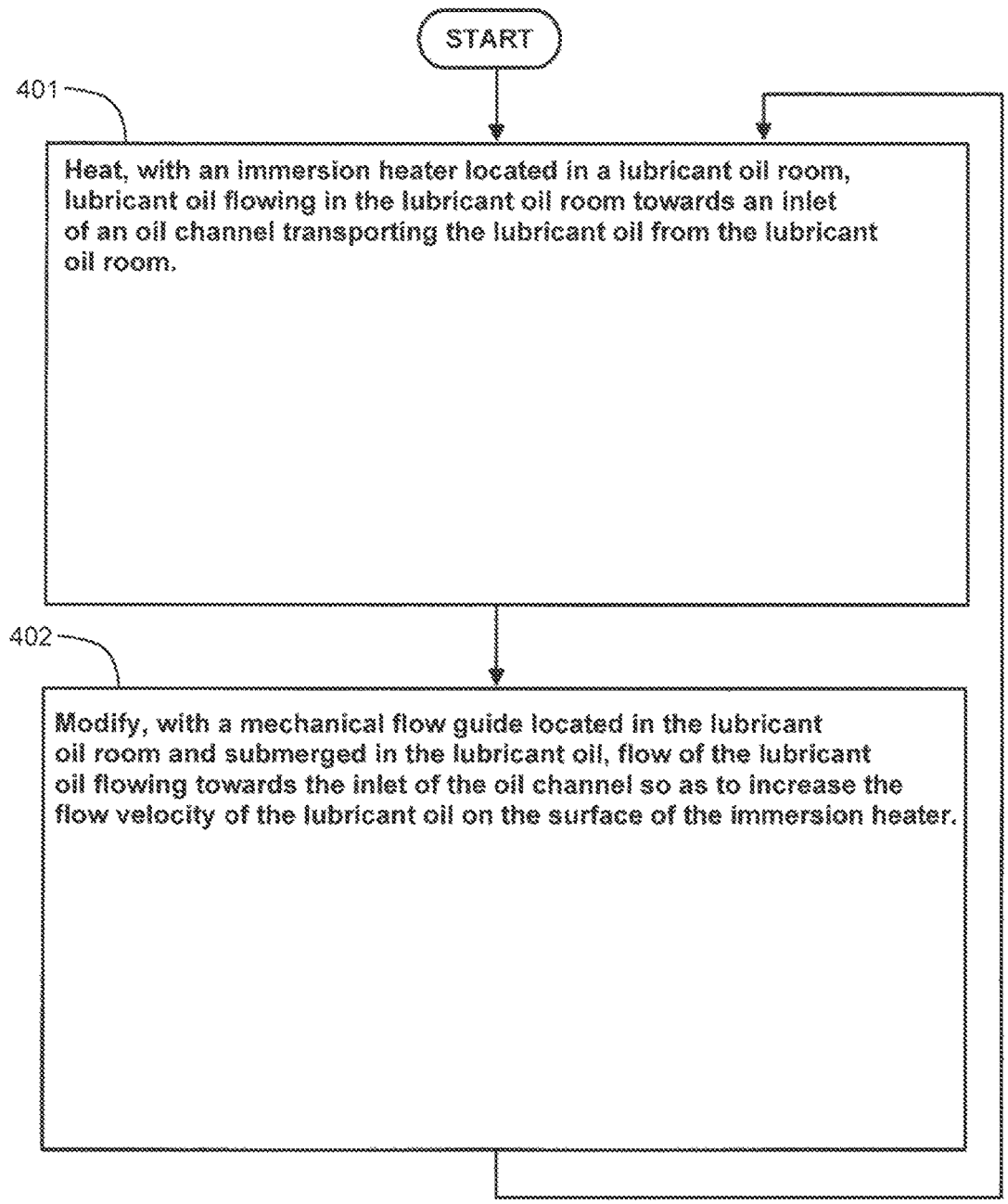
FIG. 4 shows a flow chart of a method according to an embodiment of the invention for heating lubricant oil of a gear unit.

FIG. 4 shows a flow chart of a method according to an exemplifying and non-limiting embodiment of the invention for heating lubricant oil of a gear unit. The method comprises the following actions:

action 401: heating, with an immersion heater located in a lubricant oil room, the lubricant oil flowing in the lubricant oil room towards an inlet of an oil channel transporting the lubricant oil from the lubricant oil room to parts of the gear unit to be lubricated, and actions 402: modifying, with a mechanical flow guide located in the lubricant oil room and submerged in the lubricant oil, flow of the lubricant oil flowing towards the inlet of the oil channel so as to increase the flow velocity of the lubricant oil on the surface of the immersion heater.

In a method according to an exemplifying and non-limiting embodiment of the invention, the mechanical flow guide comprises flow directing parts for guiding the lubricant oil to flow in a meandering way so as to increase the flow velocity of the lubricant oil on the surface of the immersion heater.

In a method according to an exemplifying and non-limiting embodiment of the invention, the mechanical flow guide comprises apertures for providing local minima of the cross-sectional flow area so as to increase the flow velocity of the lubricant oil on the surface of the immersion heater.

In a method according to an exemplifying and non-limiting embodiment of the invention, the mechanical flow guide comprises a control mechanism for changing the areas of the apertures and the areas of the apertures are changed after the temperature of the lubricant oil has reached a predetermined limit.

In a method according to an exemplifying and non-limiting embodiment of the invention, the mechanical flow guide comprises a tubular part so that the immersion heater is located inside the tubular part. At least a first end-region of the tubular part allows the lubricant oil to enter the tubular part and the oil channel is connected to a second end-region of the tubular part.

In a method according to an exemplifying and non-limiting embodiment of the invention, the mechanical flow guide comprises flow directing parts inside the tubular part and substantially perpendicular to a longitudinal direction of the tubular part. The flow directing parts guide the lubricant oil to flow in a meandering way inside the tubular part so as to increase the flow velocity of the lubricant oil on the surface of the immersion heater.

In a method according to an exemplifying and non-limiting embodiment of the invention, the tubular part comprises apertures at the second end-region for allowing the lubricant oil surrounding the tubular part to enter the tubular part so as to decrease an oil temperature difference between the second end-region of the tubular part and the first end-region of the tubular part.

In a method according to an exemplifying and non-limiting embodiment of the invention, the tubular part comprises two nested elements so that an inner surface of the outer element is against an outer surface of the inner element and the outer element is rotatable with respect to the inner element. The outer and inner elements comprise apertures constituting the apertures of the tubular part when the apertures of the outer and inner elements are at least partly aligned with each other. The areas of the apertures of the tubular part are changeable by rotating the outer element with respect to the inner element.

In a method according to an exemplifying and non-limiting embodiment of the invention, the above-mentioned lubricant oil room is an oil sump constituted by a casing surrounding the at least one gear stage.

In a method according to another exemplifying and non-limiting embodiment of the invention, the above-mentioned lubricant oil room is an oil tank connected with a piping to the at least one gear stage.

The specific examples provided in the description given above should not be construed as limiting. Therefore, the invention is not limited merely to the embodiments described above.

What is claimed is:

1. A gear unit comprising:
   a first shaft and a second shaft for connecting to an external mechanical system,
   at least one gear stage between the first and second shafts,
   a lubricant oil room for storing lubricant oil,
   an oil channel for transporting the lubricant oil from the lubricant oil room to the at least one gear stage, and
   an immersion heater for heating the lubricant oil flowing in the lubricant oil room towards an inlet of the oil channel, the immersion heater being located in the lubricant oil room,
   wherein the gear unit further comprises a mechanical flow guide located in the lubricant oil room and configured to modify flow of the lubricant oil flowing towards the inlet of the oil channel so as to increase flow velocity of the lubricant oil on a surface of the immersion heater.

2. A gear unit according to claim 1, wherein the mechanical flow guide comprises flow directing parts for guiding the lubricant oil to flow in a meandering way so as to increase the flow velocity of the lubricant oil on the surface of the immersion heater.

3. A gear unit according to claim 2, wherein the mechanical flow guide comprises apertures for providing local minima of cross-sectional flow area so as to increase the flow velocity of the lubricant oil on the surface of the immersion heater.

4. A gear unit according to claim 3, wherein the mechanical flow guide comprises a control mechanism for changing areas of the apertures.

5. A gear unit according to claim 1, wherein the mechanical flow guide comprises apertures for providing local minima of cross-sectional flow area so as to increase the flow velocity of the lubricant oil on the surface of the immersion heater.

6. A gear unit according to claim 5, wherein the mechanical flow guide comprises a control mechanism for changing areas of the apertures.

7. A gear unit according to claim 1, wherein the mechanical flow guide comprises a tubular part so that the immersion heater is located inside the tubular part, at least a first end-region of the tubular part being capable of allowing the lubricant oil to enter the tubular part and the oil channel being connected to a second end-region of the tubular part.

8. A gear unit according to claim 7, wherein the mechanical flow guide comprises flow directing parts inside the tubular part and substantially perpendicular to a longitudinal direction of the tubular part, the flow directing parts being capable of guiding the lubricant oil to flow in a meandering way inside the tubular part so as to increase the flow velocity of the lubricant oil on the surface of the immersion heater.

9. A gear unit according to claim 8, wherein the tubular part comprises apertures at the second end-region for allowing the lubricant oil surrounding the tubular part to enter the tubular part so as to decrease an oil temperature difference between the second end-region of the tubular part and the first end-region of the tubular part.

10. A gear unit according to claim 9, wherein the tubular part comprises two nested elements so that an inner surface of an outer one of the elements is against an outer surface of an inner one of the elements and the outer one of the elements is rotatable with respect to the inner one of the elements, the outer and inner ones of the elements comprising apertures constituting the apertures of the tubular part when the apertures of the outer and inner ones of the elements are at least partly aligned with each other and areas of the apertures of the tubular part being changeable by rotating the outer one of the elements with respect to the inner one of the elements.

11. A gear unit according to claim 7, wherein the tubular part comprises apertures at the second end-region for allowing the lubricant oil surrounding the tubular part to enter the tubular part so as to decrease an oil temperature difference between the second end-region of the tubular part and the first end-region of the tubular part.

12. A gear unit according to claim 11, wherein the tubular part comprises two nested elements so that an inner surface of an outer one of the elements is against an outer surface of an inner one of the elements and the outer one of the elements is rotatable with respect to the inner one of the elements, the outer and inner ones of the elements comprising apertures constituting the apertures of the tubular part when the apertures of the outer and inner ones of the elements are at least partly aligned with each other and areas of the apertures of the tubular part being changeable by rotating the outer one of the elements with respect to the inner one of the elements.

13. A gear unit according to claim 1, wherein the lubricant oil room is an oil sump constituted by a casing surrounding the at least one gear stage.

14. A gear unit according to claim 1, wherein the lubricant oil room is an oil tank connected with a piping to the at least one gear stage.

15. A method for heating lubricant oil of a gear unit, the method comprising:
   heating, with an immersion heater located in a lubricant oil room, the lubricant oil flowing in the lubricant oil room towards an inlet of an oil channel transporting the lubricant oil from the lubricant oil room to parts of the gear unit to be lubricated, and modifying, with a mechanical flow guide located in the lubricant oil room and submerged in the lubricant oil, flow of the lubricant oil flowing towards the inlet of the oil channel so as to increase flow velocity of the lubricant oil on a surface of the immersion heater.

16. A method according to claim 15, wherein the mechanical flow guide comprises flow directing parts guiding the lubricant oil to flow in a meandering way so as to increase the flow velocity of the lubricant oil on the surface of the immersion heater.

17. A method according to claim 16, wherein the mechanical flow guide comprises apertures for providing local minima of cross-sectional flow area so as to increase the flow velocity of the lubricant oil on the surface of the immersion heater.

18. A method according to claim 15, wherein the mechanical flow guide comprises a tubular part so that the immersion heater is located inside the tubular part, at least a first end-region of the tubular part allowing the lubricant oil to enter the tubular part and the oil channel being connected to a second end-region of the tubular part.

19. A method according to claim 18, wherein the tubular part comprises apertures at the second end-region allowing the lubricant oil surrounding the tubular part to enter the tubular part so as to decrease an oil temperature difference between the second end-region of the tubular part and the first end-region of the tubular part.

20. A method according to claim 15, wherein the mechanical flow guide comprises apertures for providing local minima of cross-sectional flow area so as to increase the flow velocity of the lubricant oil on the surface of the immersion heater.

* * * * *